United States Patent
Kramer et al.

(10) Patent No.: US 6,822,058 B1
(45) Date of Patent: Nov. 23, 2004

(54) LOW-TEMPERATURE IN-MOLD COATING COMPOSITION

(75) Inventors: David Kramer, Commerce Township, MI (US); Brad A. Haskell, Sterling Heights, MI (US)

(73) Assignee: The Sherwin-Williams Company, Cleveland, OH (US)

( * ) Notice: Subject to any disclaimer, the term of this patent is extended or adjusted under 35 U.S.C. 154(b) by 467 days.

(21) Appl. No.: 09/905,422

(22) Filed: Jul. 13, 2001

Related U.S. Application Data

(60) Provisional application No. 60/218,281, filed on Jul. 14, 2000.

(51) Int. Cl.$^7$ .................................................. C08F 4/44
(52) U.S. Cl. ........................ 526/142; 526/171; 264/279; 264/271.1
(58) Field of Search ................................ 526/142, 171; 264/279, 271.1

(56) References Cited

U.S. PATENT DOCUMENTS

| | | | |
|---|---|---|---|
| 3,584,076 A | 6/1971 | Chetakian | 260/863 |
| 3,630,960 A | 12/1971 | Chetakian | 252/426 |
| 4,076,788 A | 2/1978 | Ditto | 264/255 |
| 4,239,796 A | 12/1980 | Shanoski et al. | 428/315 |
| 4,414,173 A | 11/1983 | Cobbledick et al. | 264/257 |
| 4,508,785 A | 4/1985 | Cobbledick et al. | 428/424.4 |
| 4,534,888 A | 8/1985 | Cobbledick et al. | 252/511 |
| 4,603,181 A | 7/1986 | Nishino et al. | 525/528 |
| 4,666,978 A | 5/1987 | Storey et al. | 525/35 |
| 4,668,460 A | 5/1987 | Ongena | 264/255 |
| 5,098,950 A | 3/1992 | Kagaya et al. | 525/28 |
| 5,132,052 A | 7/1992 | Cobbledick et al. | 252/511 |
| 5,614,581 A | 3/1997 | Cobbledick et al. | 524/495 |
| 5,658,672 A | 8/1997 | Lenke et al. | 428/423.1 |
| 5,712,337 A * | 1/1998 | Discho | 524/496 |
| 5,777,053 A | 7/1998 | McBain et al. | 526/301 |
| 6,087,458 A * | 7/2000 | Nonaka et al. | 526/89 |
| 6,096,842 A * | 8/2000 | Friese et al. | 526/109 |

FOREIGN PATENT DOCUMENTS

| | | | |
|---|---|---|---|
| WO | WO 98/11166 | 3/1998 | C08L/101/00 |

OTHER PUBLICATIONS

First Chemical Corporation, Material Safety Data Sheet, Revision B—Aug. 28, 1998, pp. 1–5 Landec Corporation, Intelimer Polymer Bound Cobalt Promoters for FRP Applications, (Rev. 4–98), 7 pages.

First Cure, DMPT Accelerator, Received Jun. 17, 1999, 1 page Sartomer Company, CN–961E75—Urethane Acrylate Blended With SR–454, 1 page.

Sartomer Company, Product Bulletin: SR–349, R. 1/99, 1 page Modern Plastics, Robson F. Storey and Darren L. Smith, Improved room–temperature cure of unsaturated polyester resins, Dec., 1984, 4 pages.

Landec Corporation, Material Safety Data Sheet, Effective Date: May, 28, 1998, 5 pages First Chemical Corporation, FirstCure Performance Polymer Products, 1 page.

The Norac Company, Inc., Material Safety Data Sheet—Norox P–20, Revised Nov. 6, 1998, 3 pages, plus 2 pages of Specifications and Properties information dated Feb. 1990.

* cited by examiner

Primary Examiner—Margaret G. Moore
(74) Attorney, Agent, or Firm—Arthi K. Tirey; Robert E. McDonald; Paul R. Katterle

(57) ABSTRACT

A thermosetting in-mold coating composition and a method of using the same. The in-mold coating composition is curable at a temperature below 300° F. and includes a polymerizable resin, a promoted peroxide that includes a tertiary organic perester, a polymer-bound catalyst that includes a transition metal physically bound to a polymeric composition, and an amine synergist that includes at least one aromatic tertiary amine.

22 Claims, No Drawings

LOW-TEMPERATURE IN-MOLD COATING COMPOSITION

CROSS-REFERENCE TO RELATED APPLICATION

This application claims the benefit of U.S. Provisional Application No. 60/218,281, filed Jul. 14, 2000.

BACKGROUND OF THE INVENTION

This invention relates to in-mold coating compositions in general and, more particularly, to low-temperature curing in-mold coating compositions.

Fiber reinforced plastic (FRP) parts are typically made by a compression molding process. In a conventional compression molding process, a curable resin charge is placed between a pair of heated die members defining a mold cavity. The die members are then moved toward each other to a closed position, thereby compressing the resin charge and causing the resin charge to flow and fill the mold cavity. After the resin cures, the molds are opened and the finished part is removed.

The resin charge used to make an FRP part generally includes a thermosetting resin containing reinforcing fibers and various fillers. The charge is typically a sheet molding compound (SMC), which typically contains a thermosetting resin, about 30% by weight of glass fibers, shrink-reduction additives, and a large amount of filler. The charge, however, may also be a high strength molding compound (HMC), which typically contains a thermosetting resin, and about 50 to 60% by weight of glass fibers with very little, if any, filler or shrink-reduction additives. Because of the high glass content and lack of filler and shrink-reduction additives, an HMC part tends to shrink considerably more than an SMC part upon cooling.

The surface of an FRP part prepared by a compression molding process is often blemished with cavities, pinholes, cracks, and/or sinkers, which would make the FRP part unacceptable for many commercial applications. In recent years, however, it has become common to use what is known as an "in-mold coating" to provide an FRP part with a commercially acceptable smooth finish. Examples of "in-mold coating" methods are disclosed in U.S. Pat. No. 4,076,788 to Ditto, and U.S. Pat. No. 4,668,460 to Ongena, which are hereby incorporated by reference herein. Briefly, in an "in-mold coating" method, the cured FRP part remains in the mold and is coated with a composition that spreads and penetrates the surface to fill the cavities, etc. formed therein.

The prior art compositions used in "in-mold coating" methods are typically cured at a temperature of about 300° F., which is acceptable for many SMC parts. For other FRP parts and other compression-molded products, however, this temperature is too great. For example, it is desirable to "in-mold coat" an HMC part at a much lower temperature to permit the HMC part to shrink. Prior art compositions have been developed that cure at temperatures lower than 300° F., but these compositions have extremely short pot-lives, which make them difficult to work with.

Based upon the foregoing, there is a need in the art for an in-mold coating composition that can be cured at a temperature lower than 300° F. and still has a workable potlife. The present invention is directed to such an in-mold coating composition and a method of using the same.

SUMMARY OF THE INVENTION

It therefore would be desirable, and is an advantage of the present invention, to provide an in-mold coating composition curable at a temperature below 300° F. The in-mold coating composition includes from about 140 to about 325 parts by weight of a polymerizable resin, from about 1 to about 4 parts by weight of a promoted peroxide that includes a tertiary organic perester, from about 1 to about 6 parts by weight of a polymer-bound catalyst that includes a transition metal physically bound to a polymeric composition, and from about 0.2 to about 2 parts by weight of an amine synergist that includes at least one aromatic tertiary amine.

Also provided in accordance with the present invention is a thermosetting in-mold coating composition that includes 100 parts by weight of a polyacrylate monomer, from about 10 to about 60 parts by weight of a urethane acrylate oligomer, from about 30 to about 165 parts by weight of at least one ethylenically unsaturated monomer, from about 1 to about 4 parts by weight of a promoted peroxide that includes a tertiary organic perester and an enolizable ketone, from about 1 to about 6 parts by weight of a polymer-bound catalyst that includes a transition metal physically bound to a polymeric composition, and from about 0.2 to about 2 parts by weight of an amine synergist that includes a mixture of an N-alkyl-N-hydroxyalkyl-p-toluidine and at least one other aromatic tertiary amine different from the N-alkyl-N-hydroxyalkyl-p-toluidine.

Further provided in accordance with the present invention is an in-mold coating method wherein a charge is provided comprising a thermosetting resin and reinforcing fibers. The charge is molded into a desired shape at an elevated pressure and then at least partially cured to form a substrate. The substrate is coated with a thermosetting in-mold coating composition, which is cured at a temperature less than 300° F. The in-mold coating composition includes from about 140 to about 325 parts by weight of a polymerizable resin, from about 1 to about 4 parts by weight of a promoted peroxide that includes a tertiary organic perester, from about 1 to about 6 parts by weight of a polymer-bound catalyst that includes a transition metal physically bound to a polymeric composition, and from about 0.2 to about 2 parts by weight of an amine synergist that includes at least one aromatic tertiary amine.

DETAILED DESCRIPTION OF THE PREFERRED EMBODIMENTS

The in-mold coating composition of the present invention comprises the following main components:
  (a) a polymerizable resin;
  (b) a promoted peroxide;
  (c) a polymer-bound catalyst; and
  (d) an amine synergist Preferably, the in-mold coating composition of the present invention comprises the following additional components:
  (e) filler;
  (f) conductive carbon black;
  (g) mold release agent;
  (h) inhibitor; and
  (i) low profile additive The polymerizable resin comprises a polyacrylate monomer, a urethane acrylate oligomer, and one or more ethylenically unsaturated monomers. The polymerizable resin is polymerized and cross-linked via free radical initiated addition polymerization.

The polyacrylate monomer is a polymerizable monomer having at least two acrylate or methacrylate groups. The polyacrylate monomer may be synthesized by the transesterification reaction product of a polyol with an ester of an unsaturated carboxylic acid, such as acrylic acid, or methacrylic acid. Suitable polyols that may be used include 1,3-butylene glycol, diethylene glycol, triethylene glycol, tetraethylene glycol, polypropylene glycol, and ethoxylated bisphenol A. The polyol is preferably ethoxylated bisphenol A. Accordingly, the polyacrylate monomer is preferably ethoxylated bisphenol A di(meth)acrylate, more preferably, ethoxylated bisphenol A diacrylate, such as is commercially available from the Sartomer Company under the tradename SR-349. Applicants have found that ethoxylated bisphenol A diacrylate provides the in-mold coating composition with good adhesion, cure rate, chemical resistance, and hardness.

Other, less preferred polyacrylate monomers that may be used in the present invention include 1,3-butyleneglycol diacrylate, 1,3-butyleneglycol dimethacrylate, diethyleneglycol diacrylate, diethyleneglycol dimethacrylate, triethyleneglycol diacrylate, triethyleneglycol dimethacrylate, tetraethyleneglycol diacrylate, tetraethyleneglycol dimethacrylate, polypropyleneglycol diacrylate, and polypropyleneglycol dimethacrylate.

The urethane acrylate oligomer is a polymerizable urethane-based oligomer having at least two acrylate or methacrylate groups. The urethane acrylate oligomer may be synthesized by reacting a diisocyanate with a polyol to yield an isocyanate-terminated urethane prepolymer, which is then reacted with a hydroxy-terminated acrylate, such as hydroxy propyl acrylate, hydroxy ethyl acrylate, hydroxy ethyl methacrylate, or hydroxy propyl methacrylate. The diisocyanate may be an aromatic diisocyanate, such as toluene diisocyanate, 4,4-diphenylmethane diisocyanate, or 4,4-diphenylether diisocyanate. Alternately, the diisocyanate may be an aliphatic diisocyanate, such as isophorone diisocyanate, hexamethylene diisocyanate, or trimethylene diisocyanate. The polyol may be a polyester polyol, such as a polyethylene adipate diol, or a polyether polyol, such as a polypropylene ether diol, or a polyetherester polyol, such as a polypropylene ether adipate diol. The diisocyanate is preferably an aliphatic diisocyanate, and the polyol is preferably a polyester polyol. Accordingly, the urethane acrylate oligomer of the present invention is preferably an aliphatic polyester-based urethane di(meth)acrylate oligomer, such as is commercially available from the Sartomer Company under the tradename CN961.

The amount of urethane acrylate oligomer used in the present invention is preferably from about 10 to about 60 parts by weight, more preferably from about 10 to about 40 parts by weight, more preferably from about 15 to about 25 parts by weight, still more preferably about 20 parts by weight for every 100 parts by weight of the polyacrylate monomer.

One or more ethylenically unsaturated monomers are included in the resin portion of the in-mold coating composition. Suitable ethylenically unsaturated monomers that may be used include: (i) vinyl-substituted aromatics having from 8 to 12 carbon atoms, such as styrene, alpha-methyl styrene, divinylbenzene, vinyl toluene, or t-butyl styrene; (ii) alkyl (meth)acrylates having from 1 to 8 carbon atoms, such as ethyl acrylate, methyl acrylate, propyl acrylate, butyl acrylate, ethyl methacrylate, methyl methacrylate, propyl methacrylate, or butyl methacrylate; (iii) hydroxy alkyl (meth)acrylates having from 1 to 10 carbon atoms, such as hydroxy ethyl acrylate, hydroxy propyl acrylate, hydroxy butyl acrylate, hydroxy ethyl methacrylate, hydroxy propyl methacrylate, or hydroxy butyl methacrylate; (iv) vinyl esters having from 4 to 20 carbon atoms, such as vinyl acetate acrylonitrile, or methacrylonitrile; and (v) acrylate glycols having from 2 to 20 carbon atoms, such as ethylene glycol diacrylate, or ethylene glycol dimethacrylate. Preferably, a vinyl-substituted aromatic having from 8 to 12 carbon atoms is used in the present invention. More preferably, a vinyl-substituted aromatic having from 8 to 12 carbon atoms, and a lesser amount of a hydroxy alkyl(meth) acrylate are used in the present invention. The vinyl-substituted aromatic is preferably styrene, and the hydroxy alkyl(meth)acrylate is preferably hydroxy ethyl methacrylate.

The amount of vinyl-substituted aromatic used in the present invention is preferably from about 30 to about 150 parts by weight, more preferably from about 40 to about 100 parts by weight, more preferably from about 50 to about 70 parts by weight. still more preferably about 60 parts by weight for every 100 parts by weight of the polyacrylate monomer.

The amount of hydroxy alkyl(meth)acrylate used in the present invention is preferably from about 0 to about 15 parts by weight, more preferably from about 2 to about 10 parts by weight, more preferably from about 3 to about 8 parts by weight, still more preferably about 5 parts by weight for every 100 parts by weight of the polyacrylate monomer.

Based on the foregoing, the amount of ethylenically unsaturated monomer(s) used in the present invention is preferably from about 30 to about 165 parts by weight, more preferably from about 42 to about 110 parts by weight, more preferably from about 53 to about 78 parts by weight, still more preferably about 65 parts by weight for every 100 parts by weight of the polyacrylate monomer.

Decomposition of the promoted peroxide initiates the free radical polymerization and crosslinking of the polyacrylate monomer, the urethane acrylate oligomer, and the ethylenically unsaturated monomer(s). The promoted peroxide is a mixture of an organic peroxide and an enolizable ketone. The organic peroxide may be a ketone peroxide, such as methyl ethyl ketone peroxide, a tertiary hydroperoxide, such as cumene hydroperoxide, or a tertiary organic perester, such as tert-butyl perbenzoate or tert-butyl perlaurate. The enolizable ketone is a B-diketone, such as 2,4-pentanedione or 5,5-dimethyl-1,3-cyclohexanedione, or a derivative of acetoacetic acid, such as methyl acetoacetate or ethyl acetoacetate. Preferably, the organic peroxide is a tertiary organic perester, and the weight ratio of enolizable ketone to tertiary organic perester is in a range from 0.5–9.5 to 5—5. The tertiary organic perester is preferably tert-butyl perbenzoate. A promoted tert-butyl perbenzoate commercially available from the Norac Company under the tradename Norox P-20 is especially preferred for use as the promoted peroxide in the present invention. Norox P-20 comprises at least about 78% tert-butyl perbenzoate, and has an active oxygen content of at least about 6.4%.

The amount of promoted peroxide used in the present invention is preferably from about 1 to about 4 parts by weight, more preferably from about 1 to about 3 parts by weight, more preferably from about 1 to about 2 parts by weight, still more preferably about 1.5 parts by weight for every 100 parts by weight of the polyacrylate monomer.

The polymer-bound catalyst and the amine synergist increase the rate of decomposition of the promoted peroxide, i.e., the polymer-bound catalyst and the amine synergist are accelerators. The polymer-bound catalyst is a transition metal or transition metal-containing compound that is bound to a polymeric composition physically, but not chemically. The transition metal may be cobalt, copper, manganese, rhodium, or vanadium. The transition metal is preferably cobalt. Preferably, at least a portion of the polymeric composition is a side chain crystallizable polymer. Suitable side chain crystallizable polymers may be derived from monomers such as alkyl (meth)acrylates, fluoroalkyl (meth) acrylates, N-alkyl (meth)acrylamides, alkyl oxazolines, alkyl vinyl ethers, alkyl 1,2-epoxides, alkyl vinyl esters, α-olefins, alkyl glycidyl ethers, acrylic acid, methacrylic acid, itaconic acid, acrylamide, methacrylamide, (meth) acrylonitrile, vinyl acetate, and N-vinyl pyrrolidone. Preferably, the polymeric composition has a peak melting temperature, $T_p$, between about 104° F. and about 212° F., more preferably between about 113° F. and about 185° F., more preferably between about 140° F. and about 158° F., still more preferably about 149° F.

The polymer-bound catalyst is preferably in powder form. In order to permit the polymer-bound catalyst to be readily dispersed in the in-mold coating, the average particle size of the polymer-bound catalyst is preferably about 0.1 to 150, more preferably about 0.1 to 50, more preferably about 0.1 to 25, still more preferably about 0.1 to 10 microns.

A polymer-bound catalyst commercially available from the Landec Corporation under the tradename Intelimer 6054 is especially preferred for use as the polymer-bound catalyst in the present invention. Intelimer 6054 comprises about 4% elemental cobalt and is in powder form, having a mean particle size of about 5–15 microns. The peak melting temperature of Intelimer 6054 is about 149° F.

The amount of polymer-bound catalyst used in the present invention is preferably from about 1 to about 6 parts by weight, more preferably from about 1 to about 4 parts by weight, more preferably from about 1 to about 2 parts by weight, still more preferably about 1.5 parts by weight for every 100 parts by weight of the polyacrylate monomer.

As set forth above, the amine synergist is an accelerator, along with the polymer-bound catalyst. The amine synergist comprises at least one aromatic tertiary amine. More preferably, the amine synergist comprises an N-alkyl-N-hydroxyalkyl-p-toluidine and one other aromatic tertiary amine different from the N-alkyl-N-hydroxyalkyl-p-toluidine. More preferably, the amine synergist comprises an N-alkyl-N-hydroxyalkyl-p-toluidine and two other aromatic tertiary amines different from each other and the N-alkyl-N-hydroxyalkyl-p-toluidine. Still more preferably, the amine synergist is a mixture of an N-alkyl-N-hydroxyalkyl-p-toluidine, an N,N-bis(hydroxyalkyl)-p-toluidine, and an N,N-dialkyl-p-toluidine, wherein each alkyl group has 1 to 3 carbon atoms. Still more preferably, the amine synergist is a mixture of N-Methyl-N-Hydroxyethyl-p-Toluidine and a lesser amount of N, N-Bis-(2-Hydroxyethyl)-p-Toluidine, and a still lesser amount of N, N-Dimethyl-p-Toluidine.

An amine synergist commercially available from First Chemical Corporation under the tradename Firstcure MHPT is especially preferred for use as the amine synergist in the present invention. Firstcure MHPT comprises about 95% by weight N-Methyl-N-Hydroxyethyl-p-Toluidine, about 2.8% by weight N, N-Bis-(2-Hydroxyethyl)-p-Toluidine, and about 0.2% by weight of N, N-Dimethyl-p-Toluidine.

The amount of amine synergist used in the present invention is preferably from about 0.2 to about 2 parts by weight, more preferably from about 0.2 to about 1 part by weight, more preferably from about 0.3 to about 0.8 parts by weight, still more preferably about 0.5 parts by weight for every 100 parts by weight of the polyacrylate monomer.

Preferably, one or more fillers are included in the in-mold coating composition to provide the in-mold coating composition with a desired viscosity and flow during molding, and to improve the physical properties of the in-mold coating composition upon curing. Examples of suitable fillers that may be used include nephelline syenite, talc, clay, magnesium oxide, magnesium hydroxide, calcium carbonate, silica, mica, dolomite, aluminum hydroxide, barium sulfate, coal dust, glass microspheres, quartz, diatomite, and mixtures of the foregoing. Preferred fillers include talc, barium sulfate, and nephelline syenite. The filler(s) should be finely divided, having an average particle size of less than about 50 microns.

The amount of filler used in the present invention is preferably from about 50 to about 150 parts by weight, more preferably from about 70 to about 140 parts by weight, more preferably from about 80 to about 120 parts by weight, still more preferably about 100 parts by weight for every 100 parts by weight of the polyacrylate monomer. The specific amount of filler used, however, is dependent upon the properties desired for a particular formulation of the in-mold coating composition.

Preferably, a conductive carbon black is included in the in-mold coating composition to render the in-mold coating composition electrically conductive. In this manner, when an object coated with the in-mold coating composition is electrostatically painted, the in-mold coating composition helps dissipate the electrostatic charge. Specific examples of carbon black that may be used include ketjenblack, acetylene black, lamp black and high structure furnace black. Acetylene black is preferred.

The amount of carbon black used in the present invention is preferably from about 5 to about 20 parts by weight, more preferably from about 6 to about 15 parts by weight, more preferably from about 8 to about 12 parts by weight, still more preferably about 10 parts by weight for every 100 parts by weight of the polyacrylate monomer.

If desired, the in-mold coating composition may include colorants to lighten the color of the in-mold coating composition. Such colorants include titanium dioxide, aluminum silicates, calcium silicates, titanite, and talcs.

The in-mold coating composition preferably includes one or more mold-release agents. Metal salts of fatty acids having 10 or more carbon atoms have been found particularly useful as mold-release agents. Examples of such metal salts include zinc stearate, calcium stearate, zinc palmitate, calcium palmitate, and zinc ricinoleate. Preferably, the mold-release agent is a zinc salt of a fatty acid, more preferably zinc stearate. It is believed that a zinc salt, such as zinc stearate, functions as a secondary accelerator as well as a mold-release agent.

The amount of mold-release agent used in the present invention is preferably from about 1 to about 10 parts by weight, more preferably from about 1 to about 6 parts by weight, more preferably from about 1 to about 4 parts by weight, still more preferably about 2 parts by weight for every 100 parts by weight of the polyacrylate monomer.

In order to avoid premature copolymerization and crosslinking of the urethane acrylate oligomer, the ethylenically unsaturated monomer(s), and the polyacrylate monomer, a small amount of an inhibitor may be used. Examples of suitable inhibitors that may be used include hydroquinone, toluhydroquinone, 4-tert-butyl pyrocatechol. 2.6-di-tert-butyl-p-cresol, napthohydroquinone, p-benzoquinone, chloranil, and napthoquinone.

The amount of inhibitor used in the present invention is preferably from about 0.2 to about 2 parts by weight, more preferably from about 0.2 to about 1 part by weight, more preferably from about 0.3 to about 0.8 parts by weight, still more preferably about 0.5 parts by weight for every 100 parts by weight of the polyacrylate monomer.

Preferably, a low profile additive is included in the in-mold coating composition to reduce the shrinkage of the in-mold coating composition during the copolymerization and crosslinking of the urethane acrylate oligomer, the ethylenically unsaturated monomer(s), and the polyacrylate monomer. The low profile additive is a thermoplastic polymer. Examples of suitable thermoplastic polymers that may be used include polycaprolactones, polyurethanes, poly(vinyl acetate)s, polystyrene and styrene copolymers, and vinyl chloride-vinyl acetate copolymers. Preferably, the low profile additive is a poly(vinyl acetate), such as the carboxylated poly(vinyl acetate) available from the Union Carbide Corporation under the tradename Neulon Polyester Modifier T-Plus.

The amount of low profile additive used in the present invention is preferably from about 0 to about 15 parts by weight, more preferably from about 1 to about 10 parts by weight, more preferably from about 3 to about 8 parts by weight, still more preferably about 6 parts by weight for every 100 parts by weight of the polyacrylate monomer.

The in-mold coating composition can optionally be compounded with other ingredients, such as antidegradants, ultraviolet absorbers, flame retardants, paraffin wax, and thickening agents. These optional ingredients are used in amounts sufficient to provide desired results.

Preferably, the in-mold coating composition is prepared by first blending together all of the components, except the promoted peroxide, the polymer-bound catalyst, and the amine synergist, in a series of mixing steps performed at a temperature preferably above about 60° F., but below about 130° F. The resulting mixture is then cooled to below about 100° F. The polymer-bound catalyst and the amine synergist are then blended into the mixture to form a pre-mixed portion of the in-mold coating composition. The pre-mixed portion is preferably stored in a dry location, out of direct sunlight and at a temperature below about 60° F.

When it is desired to use the in-mold coating composition, the pre-mixed portion is mixed with the promoted peroxide to yield the in-mold coating composition of the present invention. After the pre-mixed portion is mixed with the promoted peroxide, the in-mold coating composition has a workable potlife of between about 3 to about 12 hours at ambient temperature. Preferably, the promoted peroxide is not added until just before the in-mold coating is injected into a mold cavity.

In accordance with the method of the present invention, a charge comprising a thermosetting resin and reinforcing fibers is placed in a mold having a fixed die and a movable die, which define a mold cavity therebetween. The charge is for forming a part that is preferably in-mold coated at a lower temperature, such as an HMC part. The dies are nested in the sense that they have side or shear edges that closely interfit and act as a seal during molding. A press ram closes the dies and applies a force to the dies to elevate the pressure in the mold cavity to a pressure generally in a range from about 500 psi to about 2,000 psi. Since the pressure in the mold cavity must be high enough to form the substrate into the shape of the mold cavity, the specific pressure in the mold cavity is dependent on the size and shape of the part to be formed. The temperature in the mold cavity is typically about 300° F. Once the charge is formed into the shape of the mold cavity, i.e., is molded, the charge is allowed to at least partially cure to form a substrate. During the curing of the charge, the pressure in the mold cavity may be reduced.

The extent to which the charge is allowed to cure depends on whether or not the mold is opened to inject the in-molding coating composition. If an open-mold injection process is used wherein the mold is opened to inject the in-mold coating composition (as disclosed in U.S. Pat. No. 4,076,788), the charge must be allowed to cure long enough to retain its shape when the mold is opened. If a closed-mold injection process is used wherein the in-mold coating composition is injected while the mold is closed (as disclosed in U.S. Pat. No. 4,668,460), the charge only needs to be cured long enough to provide a surface receptive to the in-mold coating composition.

Once the charge is cured to the required extent, the in-mold coating composition is injected into the mold cavity at a pressure greater than the pressure in the mold cavity. If a closed-mold injection process is used., positive pressure is maintained in the mold cavity and the in-mold coating composition is injected at a pressure substantially greater than the mold cavity pressure, usually two times and often four times greater than the mold cavity pressure prior to injection. When so injected, the in-mold coating composition is forced over the substrate, thereby coating the substrate. If an open-mold injection process is used, the in-mold coating composition is injected at a pressure sufficient to overcome any residual pressure in the mold cavity and then the mold cavity is re-pressurized to spread the in-mold coating composition over the substrate, thereby coating the substrate. Once the substrate is coated with the in-mold coating composition, the in-mold coating composition is allowed to cure.

The temperature of the mold during the injection and curing of the in-mold coating composition is less than 300° F., more preferably less than about 212° F., still more preferably between about 150° F. and about 200° F. The pressure in the mold cavity during the curing of the in-mold coating composition is typically about 1000 psi. At a temperature between about 150° F. and about 200° F. and a pressure of about 1000 psi, the in-mold coating composition has a cure time of between about 40 and about 70 seconds.

When the substrate and the in-mold coating composition are cured, the dies are separated and the resulting product is removed.

The in-mold coating composition of the present invention may used with all types of compression-molded products, such as FRP parts. The in-mold coating composition of the present invention is especially well suited for HMC parts and other compression-molded products that require an in-mold coating that cures at a lower temperature.

The invention will be better understood by reference to the following example:

EXAMPLE 1

A master batch of an in-mold coating composition embodied in accordance with the present invention was produced in the following manner. A clean water-jacketed mill was first provided. Components (a)–(n) in Table 1 were added to the mill in steps, while maintaining agitation and a maximum temperature of 130° F.

TABLE 1

| Component | Pounds | Description |
| --- | --- | --- |
| (a.) | 363.23 | CN961XS19 |
| (b.) | 108.07 | SR 349 |
| (c.) | 18.27 | Nuosperse 657 |
| (d.) | 1.63 | p-benzoquinone |
| (e.) | 5.02 | Bentone SD-2 |
| (f.) | 107.67 | Barimite XF |
| (g.) | 25.10 | acetylene black |
| (h.) | 2.31 | Raven 14 |
| (i.) | 167.48 | styrene |
| (j.) | 127.52 | micronized talc |

TABLE 1-continued

| Component | Pounds | Description |
|---|---|---|
| (k.) | 82.25 | Minex 10 |
| (l.) | 5.14 | zinc stearate |
| (m.) | 64.97 | Neulon T+ |
| (n.) | 15.72 | hydroxy ethyl methacrylate |

(a.) CN961XS19 is a premix available from Sartomer comprising: 76% by weight ethoxylated bisphenol A diacrylate, 19% by weight aliphatic polyester-based urethane di(meth)acrylate oligomer, and 5% by weight styrene
(b.) SR 349 is ethoxylated bisphenol A diacrylate available from Sartomer
(c.) Nuosperse 657 is a polymeric dispersant available from Huls America
(e.) Bentone SD-2 is an organophilic clay available from Rheox
(f.) Barimite XF is Barium Sulfate available from CIM BAR Performance Minerals
(h.) Raven 14 is carbon black available from Columbian Chemicals
(k.) Minex 10 is nepheline syenite
(m.) Neulon T+ is the carboxylated poly(vinyl acetate) available from Union Carbide discussed above After mixing components (a)–(n) together for 60 minutes, the resulting mixture was cooled to below 100° F. and then components (o) and (p) from Table 2 were added to the mill.

TABLE 2

| Component | Pounds | Description |
|---|---|---|
| (o.) | 21.7 | Intelimer 6054 |
| (p.) | 6.52 | First Cure MHPT |

(o.) Intelimer 6054 is the polymer-bound catalyst available from Landec Corporation discussed above
(p.) First Cure MHPT is the amine synergist available from First Chemical discussed above Components (o) and (p) were mixed with components (a)–(n) to complete the production of the master batch of the in-mold coating composition. The master batch had the following properties:
Weight/gallon: 10.94
% Non-volatile material weight: 77.73
% Volume solids: 68.33
% Pigment volume concentration (PVC): 21.81
% Pigment weight: 32.44
% Pigment volume: 14.90
% Resin weight: 45.29
% Resin volume: 53.42

Individual lots from the master batch were then mixed with appropriate amounts of Norox P-20 (promoted peroxide) just prior to use.

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

What is claimed is:
1. A thermosetting in-mold coating composition curable at a temperature below 300° F., said in-mold coating composition comprising:
from about 140 to about 325 parts by weight of a polymerizable resin;
from about 1 to about 4 parts by weight of a promoted peroxide comprising a tertiary organic perester;
from about 1 to about 6 parts by weight of a polymer-bound catalyst comprising a transition metal physically bound to a polymeric composition; and
from about 0.2 to about 2 parts by weight of an amine synergist comprising at least one aromatic tertiary amine.
2. The in-mold coating composition of claim 1, wherein the polymerizable resin is a product of the copolymerization of components, said components comprising:
100 parts by weight of a polyacrylate monomer;
from about 10 to about 60 parts by weight of a urethane acrylate oligomer; and
from about 30 to about 165 parts by weight of one or more ethylenically unsaturated monomers.
3. The in-mold coating composition of claim 2, wherein the one or more ethylenically unsaturated monomers comprises a vinyl-substituted aromatic monomer and a hydroxy alkyl(meth)acrylate monomer.
4. The in-mold coating composition of claim 3, wherein the polyacrylate monomer is ethoxylated bisphenol A diacrylate.
5. The in-mold coating composition of claim 4, wherein the vinyl-substituted aromatic monomer is styrene, and wherein the hydroxy alkyl(meth)acrylate monomer is hydroxy ethyl methacrylate.
6. The in-mold coating composition of claim 1, wherein the promoted peroxide further comprises a B-diketone.
7. The in-mold coating composition of claim 6, wherein the tertiary organic perester is tert-butyl perbenzoate.
8. The in-mold coating composition of claim 1, wherein the transition metal is cobalt.
9. The in-mold coating composition of claim 1, wherein the aromatic tertiary amine is N-Methyl-N-Hydroxyethyl-p-Toluidine.
10. The in-mold coating composition of claim 9, wherein the amine synergist further comprises N, N-Bis-(2-Hydroxyethyl)-p-Toluidine and N, N-Dimethyl-p-Toluidine.
11. The in-mold coating composition of claim 1, further comprising from about 50 to about 150 parts by weight filler, and from about 5 to about 20 parts by weight conductive carbon black.
12. A thermosetting in-mold coating composition comprising:
100 parts by weight of a polyacrylate monomer;
from about 10 to about 60 parts by weight of a urethane acrylate oligomer;
from about 30 to about 165 parts by weight of at least one ethylenically unsaturated monomer;
from about 1 to about 4 parts by weight of a promoted peroxide comprising an organic peroxide and an enolizable ketone;
from about 1 to about 6 parts by weight of a polymer-bound catalyst comprising a transition metal physically bound to a polymeric composition; and
from about 0.2 to about 2 parts by weight of an amine synergist comprising a mixture of an N-alkyl-N-hydroxyalkyl-p-toluidine and at least one other aromatic tertiary amine different from the N-alkyl-N-hydroxyalkyl-p-toluidine.
13. The in-mold coating composition of claim 12, wherein the organic peroxide is a tertiary organic perester.
14. The in-mold coating composition of claim 13, wherein the N-alkyl-N-hydroxyalkyl-p-toluidine comprises N-Methyl-N-Hydroxyethyl-p-Toluidine and the at least one other aromatic tertiary amine comprises N, N-Bis-(2-Hydroxyethyl)-p-Toluidine.

15. The in-mold coating composition of claim 14, wherein the amine synergist further comprises N, N-Dimethyl-p-Toluidine.

16. The in-mold coating composition of claim 12, wherein the transition metal of the polymer-bound catalyst comprises cobalt.

17. The in-mold coating composition of claim 16, wherein the polymeric composition of the polymer-bound catalyst has a peak melting temperature between about 104° F. and about 212° F.

18. An in-mold coating method comprising the steps of:
  providing a charge comprising a thermosetting resin and reinforcing fibers;
  molding the charge into a desired shape at an elevated pressure;
  at least partially curing the charge to form a substrate;
  coating the substrate with a thermosetting in-mold coating composition; and
  curing said in-mold coating composition at a temperature less than 300° F.;
  wherein said in-mold coating composition comprises:
    from about 140 to about 325 parts by weight of a polymerizable resin;
    from about 1 to about 4 parts by weight of a promoted peroxide comprising a tertiary organic perester;
    from about 1 to about 6 parts by weight of a polymer-bound catalyst comprising a transition metal physically bound to a polymeric composition; and
    from about 0.2 to about 2 parts by weight of an amine synergist comprising at least one aromatic tertiary amine.

19. The method of claim 18, wherein the in-mold coating composition is cured at a temperature less than about 212° F.

20. The in-mold coating composition of claim 18, wherein the polymerizable resin comprises:
  100 parts by weight of a polyacrylate monomer;
  from about 10 to about 40 parts by weight of a urethane acrylate oligomer;
  from about 40 to about 100 parts by weight of a vinyl-substituted aromatic monomer; and
  from about 2 to about 10 parts by weight of a hydroxy alkyl(meth)acrylate monomer.

21. The in-mold coating composition of claim 18, wherein the aromatic tertiary amine is N-Methyl-N-Hydroxyethyl-p-Toluidine and the promoted peroxide further comprises an enolizable ketone.

22. The in-mold coating composition of claim 3, wherein the polyacrylate monomer is ethoxylated bisphenol A di(meth)acrylate.

* * * * *